United States Patent [19]

van Mil

[11] 4,339,849
[45] Jul. 20, 1982

[54] METHOD OF CUTTING A SLAUGHTERED BIRD FROM VENT TO BREAST

[75] Inventor: Martinus P. G. van Mil, Boxmeer, Netherlands

[73] Assignee: Stork PMT B.V., Boxmeer, Netherlands

[21] Appl. No.: 214,234

[22] Filed: Dec. 8, 1980

Related U.S. Application Data

[62] Division of Ser. No. 10,233, Feb. 8, 1979, Pat. No. 4,266,322.

[30] Foreign Application Priority Data

Feb. 15, 1978 [NL] Netherlands .......................... 7801712

[51] Int. Cl.³ .............................................. A22C 21/00
[52] U.S. Cl. ............................................. 17/52; 17/11
[58] Field of Search ......................................... 17/11, 52

[56] References Cited

U.S. PATENT DOCUMENTS

| 2,795,815 | 6/1957 | Dahlberg | 17/11 |
| 3,886,635 | 6/1975 | Meyn | 17/11 |
| 4,117,570 | 10/1978 | Meyn | 17/11 |
| 4,136,421 | 1/1979 | Scheier | 17/11 X |

Primary Examiner—Willie G. Abercrombie
Attorney, Agent, or Firm—Silverman, Cass & Singer, Ltd.

[57] ABSTRACT

A method for eviscerating a slaughtered bird, starting from the vent and directed toward the breast point, comprising first making a circular opening at the vent of the bird using a first knife and starting a second cut in the bird by moving a second knife from the circular opening along a path offset from a straight line between the vent and the breast point avoiding cutting of the entrails of the bird located below the straight line. Preferentially, the respective knives are removed from the carcass immediately after the respective cuts are made successively, the second knife retracing its path back to the circular opening before removal.

8 Claims, 6 Drawing Figures

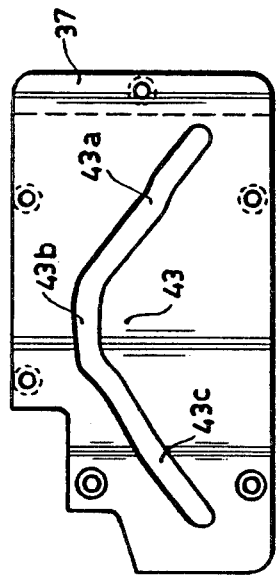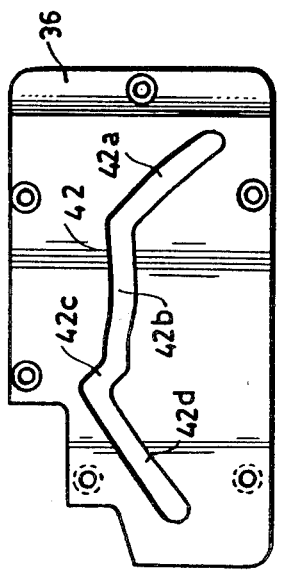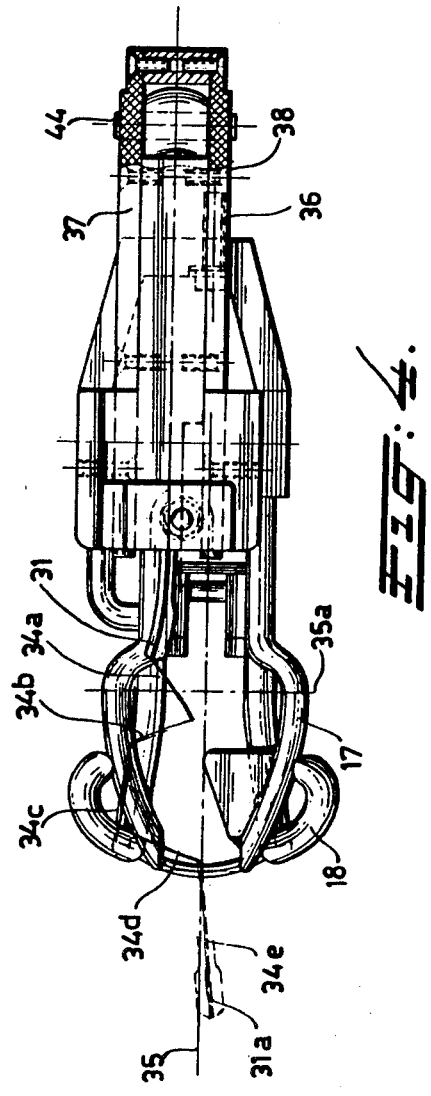

METHOD OF CUTTING A SLAUGHTERED BIRD FROM VENT TO BREAST

This is a division of application Ser. No. 10,233 filed Feb. 8, 1979, now U.S Pat. No. 4,266,322.

BACKGROUND OF THE INVENTION

The invention relates to a method of making a cut extending from the vent toward the breast in slaughtered birds, a first, round cut being made around the vent followed by a second cut starting therefrom and directed toward the breast of the bird.

The invention furthermore relates to a device for making a cut in slaughtered birds extending from the vent toward the breast, the device comprising a knife mounted in a frame and traveling with its cutting edge, along the path of a circle while being capable of being driven rotatably, and in the vicinity thereof disposed in a holder, a second knife capable of moving in a direction away from the first knife, the path of the holder being determined by the movement of at least one cam connected thereto traveling in a non-linear guideway.

DISCUSSION OF THE PRIOR ART

A method and device as described above are known per se. According to said known method and device, the cutting knife, starting from the annular opening made around the vent, travels in a straight path to the chest bone. Hereby the danger exists that the knife point will touch parts of the entrails section, in particular intestines, thus contaminating the bird's meat with the contents thereof, so that the bird must be rejected. Dutch Patent Application No. 75,13767, laid open to public inspection, already proposes a device whose object it is to obviate this drawback, but it is relatively complicated: in this device a hollow ball connected to the cutting knife is used which can be divided into two halves which can be moved independently of one another by means of a suitable driving mechanism; after bringing the ball inside the bird, the ball divides into two parts whereupon one ball half pushes the entrails to the side while the knife makes the cut.

SUMMARY OF THE INVENTION

The present invention is based upon the insight that the effect aimed at, i.e. preventing damage to the entrails, is obtainable in a simple manner, merely by making a proper choice of the path of the knife. Consequently, the method of the invention is carried out in such a manner that, while making the second cut, the cutting edge during its movement away from the vent is caused to make a sideward movement over at least a part of its travel such, that the cutting edge moves aside the area comprising the entrails.

This measure, which hardly makes a device for making this cut more complicated, effectively ensures that when making the cut the cutting edge of the knife cannot come into contact with the entrails.

In a device for carrying out the method as described hereinbefore the knife-holding arm is rotatably disposed in a holder and is provided, at its end opposite the knife, with the guide cam, the latter holder being pivotally connected about an axis crossing the axis of the knife-holding arm, being connected to a connecting rod pivoting in the frame and coupled to driving means adapted to carry out a backward-and-forward swinging movement.

The track of the guideway is then such that during the movement directed toward the breast point the cutting knife, starting from the round cut made by the rotating knife, initially carries out a movement directed sideways away from the connecting line between the vent and the breast point, followed by a movement directed toward said connecting line.

A very simple embodiment is obtained when the oblong knife-holding arm is hook-shaped having a short first part receiving the cutting knife and a second part located in the holder, the end protruding from the holder being provided with the guide cam, and the hinge joint of the holder and connecting rod being located between the flanged end and said guide cam.

The second part of the knife-holding arm located in the holder is cylindrical and supported in one or more bearing bushings located in the holder.

A favorable embodiment is obtained when the frame is provided with at least one guide plate which is located perpendicularly to the axes of the hinge joints of the connecting rod and parallel to the path of the holder comprising the guideway receiving the cam.

This measure has the advantage that the path of the knife is fully determined by the pattern of the guide slot in both a vertical and a horizontal direction, and that the device can be easily adapted to different dimensions and kinds of birds by using a plate with a different profile.

Preferably, the knife-holding arm is provided with two aligned cams protruding on both sides, each one co-operating with a corresponding guideway formed in each of the two parallel guideplates.

A favorable embodiment enabling a high production rate comprises a frame provided with positioning elements for the birds being arranged together with a number of corresponding frames in a circle and rotatable about a central shaft in a common framework to be placed at a cutting locus along a conveyor for slaughtered birds by which the birds are transported hanging by their legs, to be driven in synchronism with the conveyor.

SURVEY OF THE DRAWINGS

FIG. 4 is a top view of this device;

FIG. 5a is a lateral view of the first guide plate;

FIG. 5b is a lateral view of the second guide plate.

DESCRIPTION OF A PREFERRED EMBODIMENT

Figure 1:
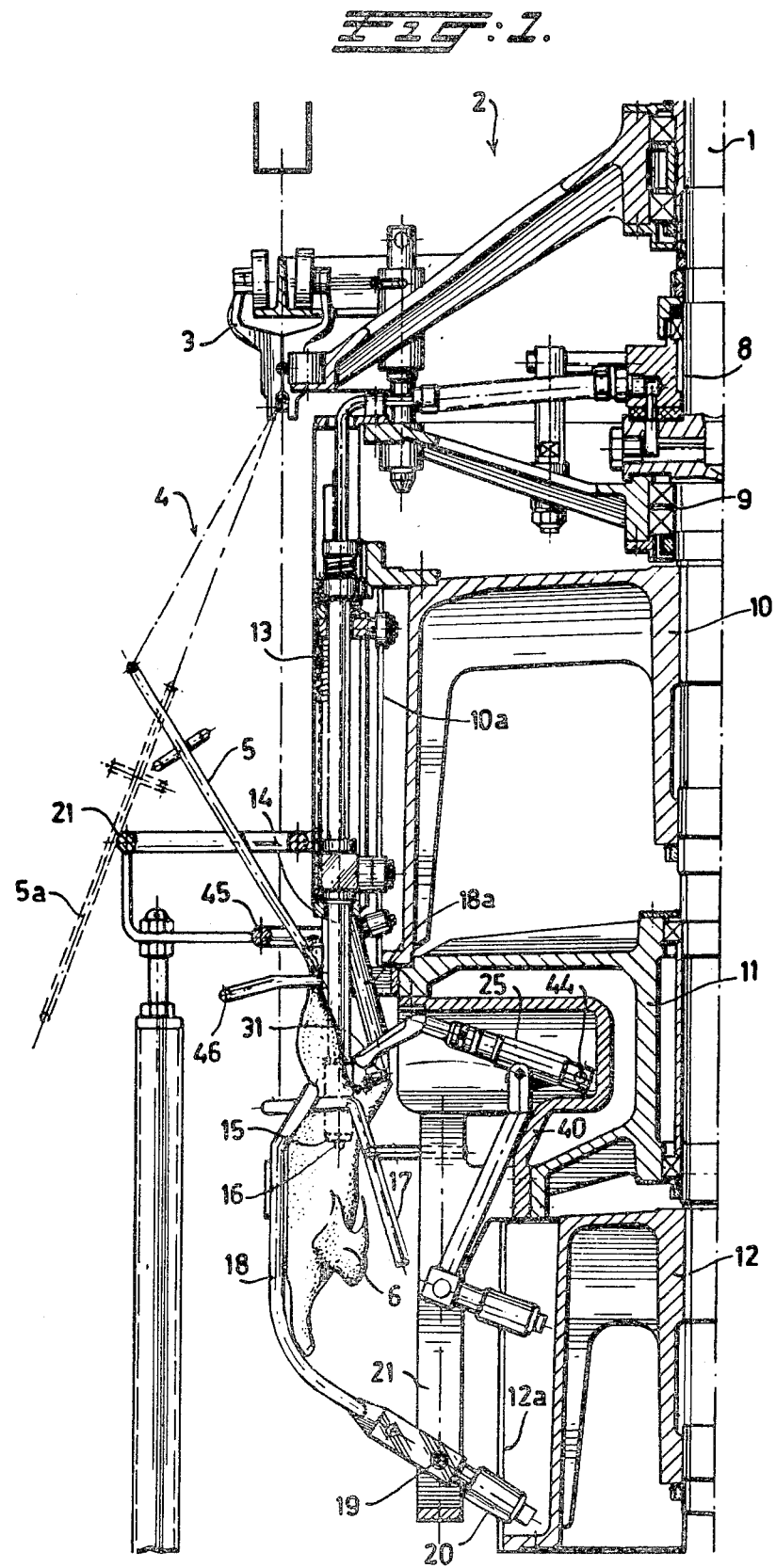
FIG. 1 is a longitudinal cross-sectional view of a treatment unit of the device according to the invention.
Figure 2:
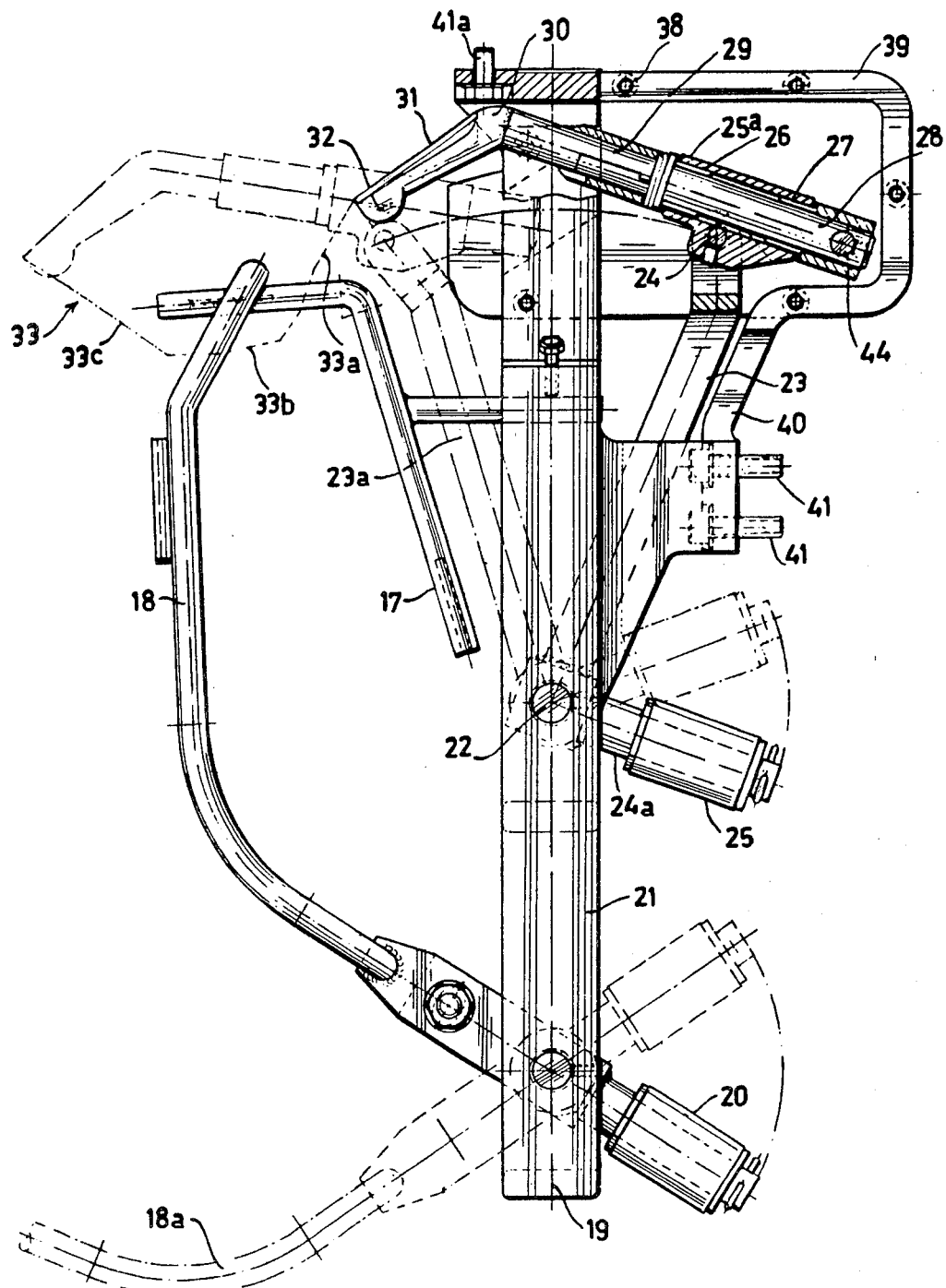
FIG. 2 is an enlarged view of the most important parts of this device, in particular the knife-holding arm.
Figure 3:
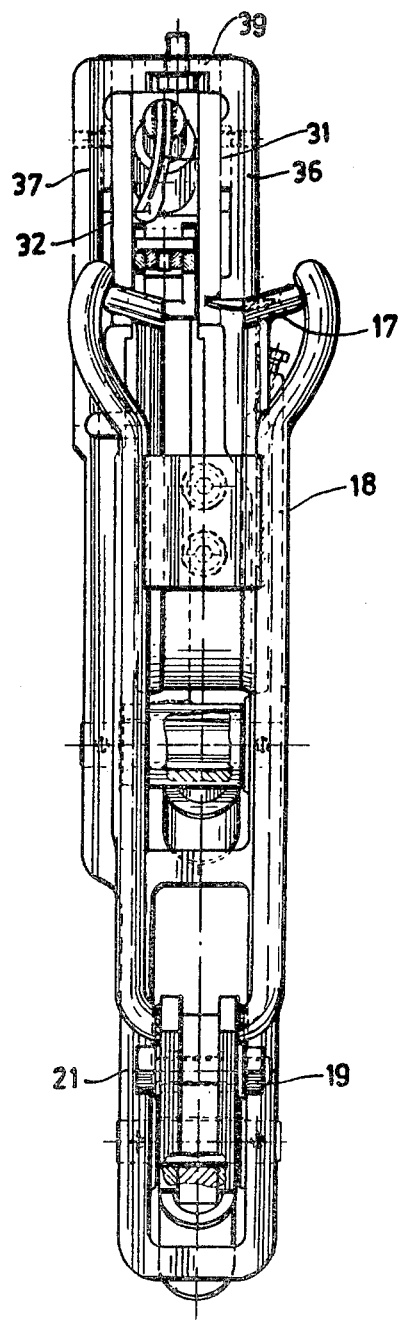
FIG. 3 is a front view of the device according to the invention.

FIG. 1 shows a central shaft 1, about which a number of treatment units are rotatably arranged, one of which being indicated in its entirety by the reference numeral 2. The treatment units rotate about said shaft in synchronism with a moving conveyor 3 known per se, to which, by way of the suspension rods 4 schematically indicated, there are suspended the known hooks 5, by which the birds 6, hooked into the hook openings by their legs, are transported. As is known in the art, the various treatment functions and movements are controlled by the movement of detents and cams of each unit along stationary guideways, not shown in detail. The complete device comprises a number, depending upon the capacity desired, of for example, sixteen to twenty units arranged at regular distances around the central shaft 1 and of the type as illustrated; the movements of the conveyor and that of the treatment units are adjusted to each other and synchronized in a manner such, that the birds are introduced into a treatment unit, are clamped therein, remain in the treatment unit during the treatment (making the cut), while simultaneously traveling in a circular, curved path, and subsequently leaving the unit. FIG. 1 shows a number of frames 7 to 12 inclusive of which the frames 10 and 12, provided with guideways, are stationary and the frame 7 to 9 inclusive and 11 rotate jointly around the shaft 1. The frames 9 and 11 support an operating unit 13, the rod 14 of which is driven both rotatably and vertically by driving means, not shown, while holding at its lower extremity the round cutting knife 15 with the guide pin 16. This known combination of cutting knife 15 and the guide pin 16 serves to make a round cut around the arse from where the cut directed toward the breast point is to be made. During this treatment the bird is secured in position between the fixed detent 17 and the movable detent 18 which can turn around the pin 19 and whose driving cam 20 co-operates with the curved track 12a. During treatment the hook 5 is in the pulled-up position as drawn. In the position 5a of the hook, the hook with the bird hanging thereon will not pass through the device but instead will go around it on the outside, because the side of the hook will run against the guideway 21. The bird is drawn in the Figure in the treatment position. The tail is then pressed backwards by the detent 18a. In FIG. 2, which is an enlarged view of the elements of importance to the invention, the discontinuous lines 18a indicate the position of the movable detent 18 for introducing the bird into the treatment unit; continuous lines indicate in this Figure the position during the treatment.

The elements of importance to the invention are formed by the cutting knife for making the cut running from the round cut made in the vent toward the breast point, and the special actuating elements therefor.

FIG. 2 shows the vertical support 21, which is connected to a frame 11 and which supports the pivotal detent 18, and wherein, at a distance upwards from the point of rotation 19, the pivot 22 supports the connecting rod 23 with the operating arm 24a fixedly connected thereto having an operating cam 25 which cooperates with a guideway not shown in the drawing. The whole device has been arranged in such a manner that when carrying out the rotary movement around the central shaft 1, at a given moment when the bird has been clamped in, the guideway pushes the guide cam 25 upwards so that the rod 23 shifts from the position indicated by the discontinuous line. At the extremity of the rod 23 there is pivotally connected with the pivot 24 the knife holder 25a with the guide bushings 26, 27, wherein there is disposed rotatably about the axis 28 the cylindrical knife-holding arm 29 whose hook-shaped end 30 holds at the front edge the cutting knife 31. The lower end of the hook-shaped end 30 is, as indicated by the reference numeral 32, rounded and so cannot cause damage to the entrails when moving back. In its movement the knife 31 has to travel along a complicated path: from the starting position as shown in FIG. 2 with the continuous line, to the final position as drawn with the discontinuous line, the point of the knife moves, as indicated by the discontinuous line 33 in FIG. 2, not only first downwards and thereupon upwards again (path sections 33a, 33b, 33c), but also, as indicated by the discontinuous line 34 in FIG. 4,—which Figure is partly a plain and partly a cross-sectional view of the upper part of the unit shown in FIG. 2—the cutting edge of the knife 31, which in the starting position as viewed from above is on the right-hand side of the line 35 whose point of intersection with the line 35a indicates the center of the vent, first has to make a movement directed toward the line 35 (line section 34a), subsequently a swift movement directed away from the line 35 (line section 34b), then a somewhat diverging movement (line section 34c), thereupon again a swift movement directed towrad the line 35 (line section 34d) followed by a movement running practically parallel to the line 35 (line section 34e). Finally, in the position as drawn by the dotted line 31a, the knife comes to a momentary rest; when the movements proceed again, the path described above is traveled in the reverse direction.

The advantage of this special path of the knife, which is essential to the device of this invention, is the fact that, when making the cut departing from the circular vent cut and directed toward the breast point, the cutting edge of the knife moves around the area containing the entrails (line sections 34b, 34c, 34d), thus preventing any possibility of damaging the entrails and subsequent disadvantages (contamination of the bird's meat and subsequent rejection thereof).

Bringing about this particular path pattern is, of course, possible in various ways, but the invention proposes a very effective and technically simple solution, having the advantage that it is possible to obtain any desired path pattern by simply exchanging two parts. These parts are formed by the end plates 36, 37 secured with screws 38 to the sides of a substantially U-shaped frame 39, whose downwardly extending supporting part 40 is attached to the frame 11, jointly with the frame part 21, by means of the screws 41, 41a. On one side the space within the U-shaped frame 39 is closed off by the end plate 36 and on the other side by the end plate 37. As shown in FIGS. 5a and 5b, each of the plates 36 and 37 is provided with a guide slot 42 and 43 respectively, which have different patterns with respect to each other; this slot is adapted to receive the guide pin 44 located at the end of the cylindrical knife-holding arm 29. When the connecting rod 23 moves from the position indicated by the continuous line to the position indicated by the discontinuous line, said two slots in combination determine the pivoting of the knife holder 25a about the pivot 24, and thus the downwardly directed movement of the point of the knife 31 (as indicated by the line 33 in FIG. 2) as well as the rotation of the cylindrical knife-holding rod 29 about the axis 28 and thus the path of travel of the cutting knife 31 in the horizontal plane, as indicated by the line 34 in FIG. 4. In order to obtain the desired path-complicated-the slot 42 has a rising portion 42a, a relatively long, initially somewhat descending and then rising portion 42b followed by a steeply rising portion 42c, with which a portion 42d is vertically associated at an angle of about 45°. The slot 43 comprises a rising portion 43a, a curved portion 43b with a relatively large radius of curvature and a relatively steeply descending portion 43c.

The advantage of the driving means of the knife described above is that, since the guide plates determine both the vertical and the horizontal movements of the knife by exchanging said plates for plates having slots with different patterns, the device can be quickly adapted in a simple manner to the birds to be treated, since the depth of the cut as well as the path of the knife in a horizontal direction, can be chosen as desired. The guide plates may consist of a wear-resistant synthetic material requiring little maintenance, while in addition they provide some protection against humidity to the knife-holder mechanism so enclosed.

Several elements not essential to the present invention have not been discussed in the above description; when being introduced into a treatment unit, the hook 5 will, naturally have to be guided, for which purpose it is possible to employ guideways such as the guideway 21 and the guideway 45, and the hook puller 46. The knife may be a cutting knife known per se, for instance a "Stanley" product, that, in an easily exchangeable manner, may be fitted into the hook-shaped portion 30 of the knife-holding arm.

What is claimed is:

1. A method of cutting open a slaughtered bird between its vent and breast point while the bird is moving along a conveyor which comprises
   A. cutting a circular opening at the vent of the bird as a first cut, said opening having its axis aligned with a straight line from the vent to the breast point,
   B. starting a second cut in the bird at the circular opening and extending toward the breast point along said axis,
   C. continuing the second cut along a portion of the cut that is laterally offset from said line between the vent and breast point by a predetermined lateral distance so as to avoid cutting certain entrails located within the bird below said straight line and
   D. completing the second cut in a movement back to said breast point.

2. The method as claimed in claim 1 in which said knives are moved synchronously with the bird movement on said conveyor while making said cuts.

3. The method as claimed in claim 1 or 2 in which the circular opening is made with a circular knife, the cutting comprising rotating and entering the bird with said circular knife followed by removal of said knife, the second cut being made by a relatively planar blade knife which traces the complete path of the second cut.

4. A method of cutting open a slaughtered bird between its vent and breast point while the bird is moving along a conveyor which comprises
   A. cutting a circular opening at the vent of the bird as a first cut by rotating a circular knife and entering the bird with said circular knife followed by removal of said knife,
   B. starting a second cut in the bird at the circular opening and extending toward the breast point using a relatively planar blade knife,
   C. completing the second cut along a path that is laterally offset from a straight line between the vent and breast point using said relatively planar blade knife to trace the complete path of said second cut so as to avoid cutting certain entrails located within the bird below said straight line, and
   D. removing the blade knife from the bird after making the second cut.

5. A method of making a cut in a slaughtered bird extending from the vent to the breast point of the bird while the bird is moving along a conveyor which comprises
   A. inserting a rotary knife into the bird at the vent, cutting a circular opening at the vent and removing the rotary knife,
   B. inserting a second knife having a relatively planar blade into said circular opening and moving the second knife toward the breast point while cutting the bird's skin in a path which makes a second cut while the second knife is carried along a path laterally displaced from a direct line between the vent and breast point so as to avoid cutting certain entrails of the bird, and
   C. thereafter removing the second knife from the bird.

6. The method as claimed in claim 4 or 5 in which the blade knife is removed from the bird only after the blade has been reversed in its movement from vent toward breast point and has retraced the path of the second cut to the circular opening.

7. The method as claimed in claim 5 in which the second knife is moved back to said circular cut after having made the second cut along said path and is removed from said bird at said circular cut.

8. The method as claimed in claims 4 or 5 in which the knives are moved synchronously with the bird movement on the conveyor while making said cuts.

* * * * *